(12) United States Patent
Kobayashi

(10) Patent No.: US 6,254,259 B1
(45) Date of Patent: Jul. 3, 2001

(54) VEHICLE LAMP SYSTEM

(75) Inventor: Shoji Kobayashi, Shizuoka (JP)

(73) Assignee: Koito Manufactuting Co. Ltd., Tokyo (JP)

(*) Notice: Subject to any disclaimer, the term of this patent is extended or adjusted under 35 U.S.C. 154(b) by 0 days.

(21) Appl. No.: 09/313,201

(22) Filed: May 18, 1999

(30) Foreign Application Priority Data

May 18, 1998 (JP) .................................................. 10-134986

(51) Int. Cl.[7] .................................................. B60Q 1/02
(52) U.S. Cl. ................ 362/465; 362/464; 362/465; 362/466; 362/467; 362/276; 340/459; 340/462
(58) Field of Search ................................ 362/464, 465, 362/466, 467, 276; 340/459, 462

(56) References Cited

U.S. PATENT DOCUMENTS

| | | | |
|---|---|---|---|
| 5,374,852 | 12/1994 | Parkes | 307/10.8 |
| 5,418,429 | 5/1995 | Laman | 315/82 |
| 5,614,788 | * 3/1997 | Mullins et al. | 315/82 |
| 5,896,085 | * 4/1999 | Mori et al. | 362/464 |
| 5,998,929 | * 12/1999 | Beechtel et al. | 315/82 |
| 6,097,023 | * 8/2000 | Schofield et al. | 362/61 |

FOREIGN PATENT DOCUMENTS

| | | | |
|---|---|---|---|
| 0 869 031 A2 | 10/1998 | (EP) . | |
| 197 56 574 A1 | 10/1998 | (DE) . | |
| 63-176736 | 7/1988 | (JP) | B60K/23/08 |
| 10-44860 | 2/1998 | (JP) | B60Q/1/02 |

* cited by examiner

Primary Examiner—Sandra O'Shea
Assistant Examiner—Anabel Ton
(74) Attorney, Agent, or Firm—Morgan, Lewis & Bockius LLP

(57) ABSTRACT

The present invention discloses a vehicle lamp system providing a better control in illumination of vehicle lamps in response to various weather and road conditions. The vehicle lamp system includes vehicle lamps, environment detection means for detecting weather and road surface conditions, and illumination control means for controlling an illumination of the vehicle lamps based on the weather and road surface conditions received from the environment detection means.

30 Claims, 10 Drawing Sheets

VEHICLE LAMP SYSTEM

BACKGROUND OF THE INVENTION

This application claims the benefit of Japanese Application No. Hei-10-134986 filed May 14, 1998, which is hereby incorporated by reference.

1. Field of the Invention

The present invention relates to a vehicle lamp, and more particularly, to a vehicle lamp system. Although the present invention is suitable for a wide scope of applications, it is particularly suitable for providing a better control in illumination of a vehicle lamp system in response to various weather and/or road surface conditions.

2. Discussion of the Related Art

Illumination lamps mounted on a vehicle are usually operated under various weather conditions depending upon environment in which the vehicle travels. Thus, there is a demand for assurance of a safe driving by way of varying a luminous intensity with road surface conditions.

However, a conventional lamp has encountered a difficulty in ensuring a sufficient luminous light or marker light even in the event of degradation of weather conditions and changes in road surface conditions. For example, a vehicle lamp system adopting headlamps has a potential problem in reduction of an efficiency of the luminous light. In addition, the sight of drivers of oncoming vehicles on the opposite lane or pedestrians may be hindered by the light especially when the condition of the road surface is deteriorated. Further, an intensity of the marker lamps or signal lamps themselves may be reduced due to fog or rain.

SUMMARY OF THE INVENTION

Accordingly, the present invention is directed to a vehicle lamp system that substantially obviates one or more of problems due to limitations and disadvantages of the related art.

Another object of the present invention is to provide a better control in illumination of vehicle lamps in response to weather and road surface conditions.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a vehicle lamp system includes vehicle lamps, environment detection means for detecting weather and road surface conditions, and illumination control means for controlling an illumination of the vehicle lamps based on the weather and road surface conditions received from the environment detection means.

In another aspect of the present invention, a vehicle lamp system includes vehicle lamps, a lamp driving device for controlling a range and a direction of an illumination of the lamps, a lamp dimmer for controlling an intensity of the lamps, environment detection means for detecting weather and road surface conditions, illumination control means for controlling the lamp driving device and the lamp dimmer based on the weather and road surface conditions received from the environment detection means, and driving means for changing a range and a direction of the illumination of the vehicle lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DESCRIPTION OF THE PREFERRED EMBODIMENT

Reference will now be made in detail to the preferred embodiments of the present invention, examples of which are illustrated in the accompanying drawings. Wherever possible, the same reference numbers will be used throughout the drawings to refer to the same or like parts.

Figure 1:
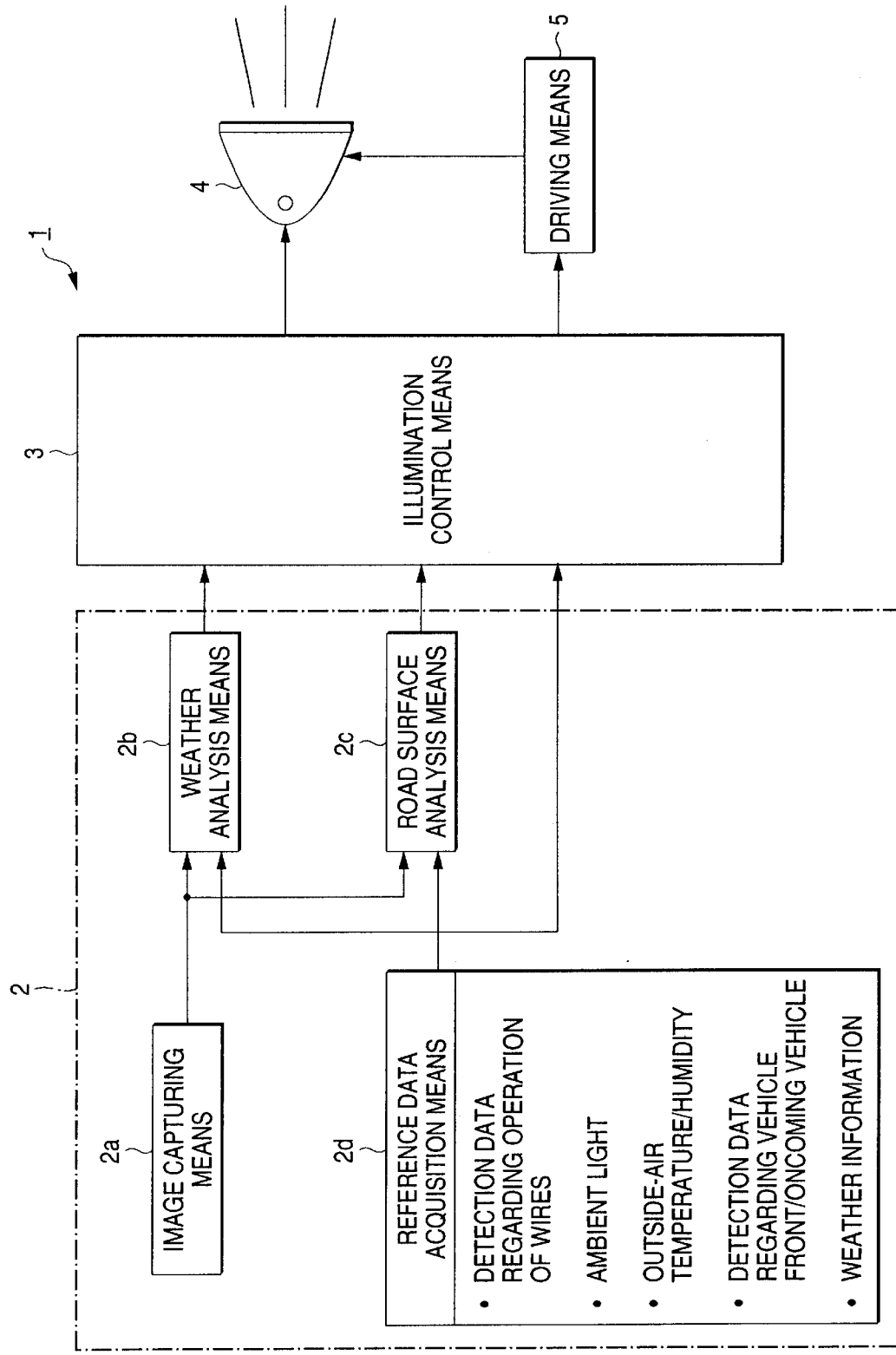
FIG. 1 is a schematic diagram illustrating a configuration of a vehicle lamp system according to the present invention.

As shown in FIG. 1, a vehicle lamp system 1 in the present invention includes environment detection means 2, illumination control means 3, a lamp 4, and driving means 5.

The environment detection means 2 detects weather and road surface conditions. Specifically, the environment detection means 2 includes image capturing means 2a, weather analysis means 2b, road surface analysis means 2c, and reference data acquisition means 2d.

The image capturing means 2a acquires image data on the surroundings of a vehicle. For example, a charge coupled device (CCD) camera may be used as the image capturing means 2a. Generally, the image capturing means 2a is mounted on a windshield, exterior of the passenger compartment, or a front portion of the vehicle.

The weather analysis means 2b detects weather conditions (rain, fog, snow, etc.) immediately outside the vehicle by receiving the image data from the image capturing means 2a or the information from the reference data acquisition means 2d.

The road surface analysis means 2c determines conditions of the road surface by receiving the image data from the image capturing means 2a or information from the reference data acquisition means 2d. For example, by analyzing a contrast in brightness of a mark on the road (e.g., a painted line), the road surface analysis means 2c determines the road surface conditions (e.g., dry, wet, snowy, etc.) or a geometry of a traveling path from a magnitude in the contrast. Preferably, the road surface analysis means 2c is provided with means for analyzing road structures (e.g., guard rails or glare-reducing fences), as desired. Thus, when there is no clear mark on the road, the analysis means determines a geometry of a traveling path based on other road structure, such as guard rails, a median, trees and plants along shoulders, a gap between snow banks left along a snow-laden road and the road surface, and a boundary between trails and snow-laden areas.

The reference data acquisition means 2d acquires reference data for the environment detection means 2 to estimate weather or road surface conditions from data other than the image data regarding ambiences of the vehicle. The reference data are delivered to the weather analysis means 2b, the road surface analysis means 2c, and the illumination control means 3. The reference data includes operational data for the apparatus mounted on the vehicle, environment illumination data, weather data, outside air temperature/humidity data, and data for detecting an oncoming vehicle or another vehicle traveling ahead of the vehicle of interest. For example, the reference data acquisition means 2d may include a control switch for activating wipers attached to the vehicle, extraneous light detection means for detecting ambient light of the vehicle (i.e., illumination detection sensor or the like), means for receiving from communications device disposed along a road, data regarding weather or road surface conditions (e.g., a receiver for use in road-to-vehicle communication, a navigation system, or the like), and a sensor for detecting outside temperature and humidity.

The illumination control means 3 controls illumination of lamps 4 mounted on the vehicle based on the detection data received from the environment detection means 2. The lamps 4 include lighting units, such as headlamps and marker lamps.

The lamps 4 controlled by the illumination control means 3 have the following functions: (a)distribution of luminous intensity; (b) intensity of light (including switching off the lamps); and (c) light color.

In some cases, driving means 5 for changing the range of illumination of the lamps 4 or the direction in which the lamps 4 illuminate may be required for controlling the distribution of luminous intensity. The intensity of light is controlled by regulating the power supplied to the light source or by changing the degree of shielding in case that a light shielding member is employed. A light color can be controlled by switching between light sources or by use of a color filtering member or a like component.

Control mode categories used for the illumination control means 3 include at least two or more categories corresponding to weather conditions, such as fair or rainy condition. Preferably, there are additional categories corresponding to other weather conditions such as foggy or snowy condition, as required. The lamps 4 may be more effectively controlled by the stepwise or continuous control in distribution of luminous intensity, intensity of light, and light color in accordance with the amount of precipitation of snow and the density of fog.

A method of determining the weather and road surface conditions from the results of image analysis performed by the weather analysis means 2b and the road surface analysis means 2c will be explained as follows.

Figure 2:
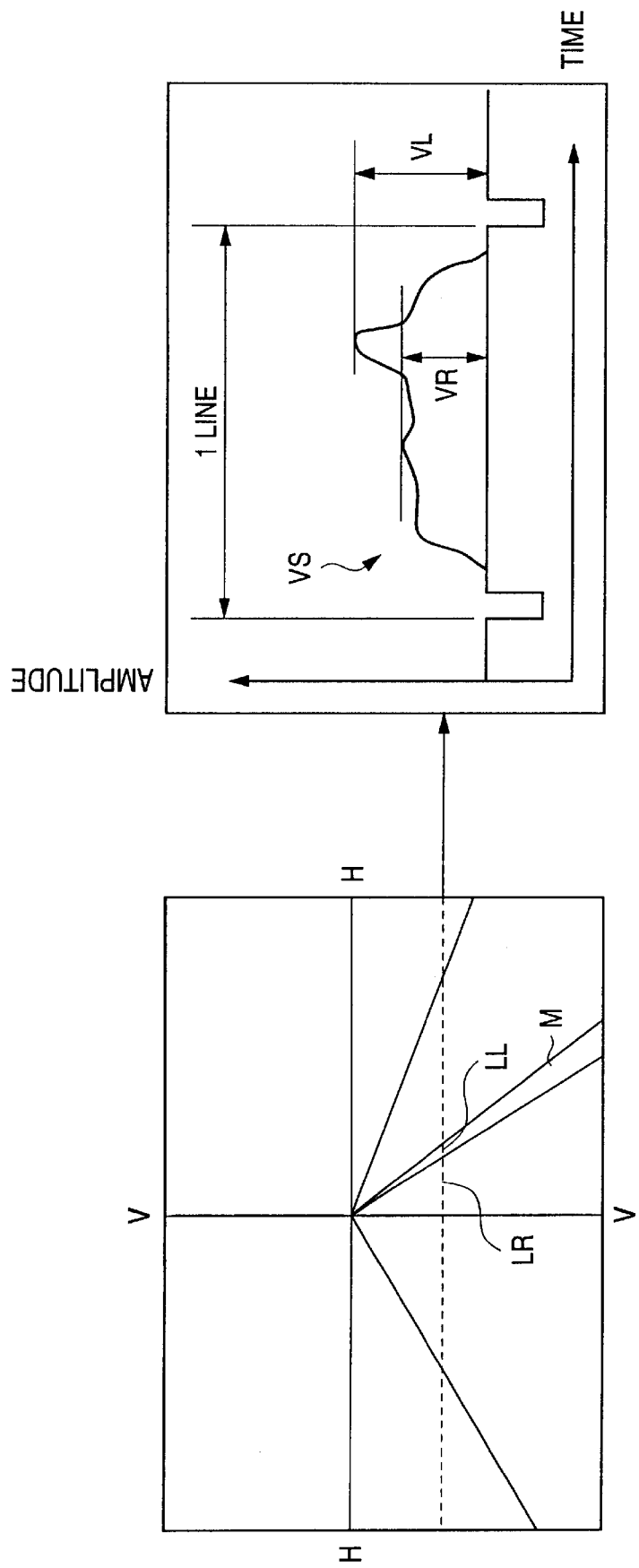
FIGS. 2A and 2B are schematic diagrams illustrating a principle of detection of a lane marker based on image data.

FIGS. 2A and 2B are schematic diagrams for describing a method of detecting a lane marker on the road from the image data received by the image capturing means 2a. A diagram provided in FIG. 2A shows an image of a road surface that is captured during a movement of the vehicle. Line H—H designates a horizontal line, line V—V designates a vertical line; and a broken line designates a line cursor. A waveform diagram provided in FIG. 2B shows a video signal VS for one line relating to the road surface image.

It is a well known principle that there is a correlation between a brightness and a voltage output from an image capturing element. It is provided that the brightness of a lane marker M on the screen is taken as LL and the brightness of the road surface is LR, a voltage of the video signal VS corresponding to the brightness LL is depicted by VL, and a voltage of the video signal VS corresponding to the brightness LR is depicted by VR. VL is greater than VR.

In detecting the lane marker M, difference data VL–VR are obtained in order to determine a profile of the edge of the lane marker M. If the difference data VL–VR are higher than a certain threshold value, a detected area is determined to be the edge of the lane marker M. The overall captured image is subjected to such processing, thereby extracting the profile of structures in the image. If the extracted profile substantially matches the feature of the lane marker, the detected image is determined to be a lane marker. Application of this method is not limited to detecting a lane marker. The method can also be used for detecting a vehicle, road structures, and obstructions.

It is important to note that a relative value (VL–VR)/VR, which represents a contrast of brightness of the lane marker M, is also changed accordingly when the state of the road surface varies with weather conditions.

Table 1 shows an example of magnitude of the relative value (VL–VR)/VR (High, Intermediate, Low, and Nearly Zero), given that "fair, light rain, rain, heavy rain, fog, and dense fog" are taken as weather conditions and "dry, wet, and flooding" are taken as road surface conditions.

TABLE 1

| Weather Conditions | Road Surface Conditions | Brightness Contrast $(V_L - V_R)/V_R$ |
| --- | --- | --- |
| Fair | Dry | Inermediate |
| Fair | Wet | High |
| Light Rain | Wet | High |
| Rain/Heavy Rain | Flooding | Low |
| Fog | Wet | Low |
| Dense Fog | Wet | Nearly Zero |

Assuming that a value of (VL–VR)/VR for a fair and dry state (for example, a value of about 5) is taken as a reference value, the value of (VL–VR)/VR becomes higher (e.g., to a value of 10 or more) when the road surface becomes wet after rain or light rain and that the value becomes lower (e.g., to a value of 1 or less) when flooding occurs under foggy weather. In the value of (VL–VR)/VR, the value relating to a portion of the image covering the area proximate to the car is lower than the value relating to a portion of the image covering the area distant from the car (i.e., close to the threshold value of resolution of the image capturing means 2a).

As mentioned above, weather and road surface conditions can be roughly estimated by acquisition of the features of the traveling path from the captured image and analysis of the value of (VL−VR)/VR (the contrast of brightness) of the specific portion, such as a lane marker or a like marker, on the road.

In order to increase an accuracy of estimate, the reference data drawn from the reference data acquisition means 2d should be considered. For instance, activation/deactivation of the wiper control switch can be utilized, as indirect information which reflects recognition of rain by the driver in determining whether the weather is fair or rainy. Further, from the data regarding the time period during which the wipers are operating and the duration of intervals at which the wipers operate, a weather condition such as a rainfall or snowfall may be ascertained.

Alternatively, weather information received by means of a radio signal or a near-infrared emitted from a communication facility as a road-to-vehicle communication may also be used for increasing an accuracy of estimate of the weather condition.

In case that distinction between the daytime and the nighttime is required for determining weather and road surface conditions, a light sensor may be employed for use in detecting outside light. Also, a method of computing a brightness of surroundings of the vehicle from an image of the road surface captured by the image capturing means 2a or an image which covers the environment including the entire sky captured by a fisheye lens may be used. Further, a method of utilizing calendar and time information received from timer means may be employed.

For instance, a beam of light for the headlamps arising in a fog during the nighttime presents a problem in determining a weather condition from the captured image whether the weather is rainy or foggy. Assuming that a voltage of the detection signal corresponding to a brightness of the beam is VB, a value of VB increases with a density of fog. Depending on intensity of the light from the headlamps, B becomes higher than the voltage corresponding to the brightness of the lane mark at a certain density of fog. Accordingly, the relative value (VL−VB)/VB becomes lower in accordance with an increase in the density of fog, thereby changing from a positive value to a negative value.

In contrast, the light from the headlamps has little effect on a brightness of the road surface during daytime fog. Therefore, with regard to the value of (VL−VR)/VR, which represents the contrast of brightness of the lane marker, there is little difference in VR measured between the center of the traffic lane and the periphery of the lane mark. However, in case that there is a reduction in daylight illumination (e.g., at dusk), the difference in locations where VR is measured imposes a problem. For this reason, a position of measurement of VR is determined in consideration of influence of the light beam.

In the case of snow, various situations must be taken into consideration when an image of the lane mark during snow is recognized. For instance, two cases should be considered; snow remains on the road surface an no snow remains on the road surface. When no snow remains on the road surface, three different situations may be considered; a dry road surface, a wet road surface, ad a frozen road surface. When snow remains on the road surface, three different situations may be considered; the road surface that is fully covered with snow, unmelted snow remaining on the road surface, and tracks formed in snow.

In case that snow remains on the road surface, recognition of the lane marker in snow may be considered almost equal to that in fog. Hence, the light from the headlamps or daylight is scattered by snow. In this case, although the lane marker is visible, the lane marker may become less visible by degrees.

In case that snow accumulates on the road surface, the lane marker may becomes partially visible or completely invisible depending upon the state of the accumulated snow. Even when the lane marker is partially visible, the marker may eventually become less visible in conjunction with an increase in the amount of the accumulated snow.

The accumulated snow may be recognized through an analysis of an image by means of the fact that the brightness of the accumulated snow is usually higher than that of the road surface. To determine whether or note the road surface is completely covered with snow, the following situations are considered. A lane marker does not appear in the area of the captured image where the lane marker or shoulders should be visible, as well as the presence of tracks in the snow.

In case that wipers are activated while the vehicle is in motion during snow (or rain or fog), the wipers pass in front of the image capturing means 2a, thereby affecting an image capturing operation. In this case, a location of wipers is taken into consideration. Also, images less affected by the passing action of the wipers is taken into account and subjected to analysis.

The illumination control means 3 will now be described by reference to the following exemplary weather conditions such as (I) rain, (II) fog, and (III) snow.

For (I) rain, the following problems must be solved.

(I-1) a reduction in reflectivity due to wetting of the road surface;

(I-2) a drop in visibility of the road geometry;

(I-3) dazzle due to a reflection of light by the road surface; and (I-4) a drop in visibility of markers due to an increase in the amount of rainfall.

When the road surface is determined to be wet during the nighttime in rain, a reflectivity of the road surface decreases to about one-tenth comparing to that of the road surface during the nighttime without rain. Thus, the effect of lighting the road surface by the headlamps is much decreased. Further, in case that a water film or mud is formed on the lane marker of the road surface, a contrast of brightness decreases along the boundary between the road surface and the lane marker. As a result, it becomes difficult to recognize a road geometry. Those conditions also account for the driver's uneasiness in driving in the rain at night.

In case that the light emanated from the headlamps to the road surface is subjected to a reflection by the water film present on the road surface, the reflected light may daze a driver of other vehicles, thus making a night driving hazardous. Further, when an amount of rainfall is large, visibility of brake lights or tail-lights is also deteriorated.

A retro-reflection factor of the road surface usually introduced tends to become smaller as the beam is directed higher For example, there is a situation where the road surface is far away from the front of the vehicle. In case that a water film is present on the road surface, the retro-reflection factor decreases further. For this reason, the road surface far away from the vehicle cannot be illuminated brightly enough. Therefore, a method of controlling the direction of illumination of the headlamps may be necessary. For example, when a vehicle moving on the left-hand side of the road enters into a rightward curve, dazzling the drivers of oncoming vehicles may be increased by changing the direction of illumination of the headlamps. Hence, such a method is not desirable.

When a vehicle traveling in the rain approaches another vehicle traveling to the opposite direction, a driver's uneasiness in driving in the rain is eliminated by increasing an intensity of the light directed at the right shoulder of the road or by means of the beam focused at the road surface close to the front of the vehicle (i.e., the road surface within 10 mm of the front of the vehicle). To this end, two methods may be employed; a method of increasing the amount of the light directed at the road surface close to the front of the vehicle or the amount of the light directed at the shoulder of the road, through control of distribution of luminous intensity in a downwardly-directed beam; and a method of additionally switching to auxiliary lamps for supplementing a downwardly-directed beam (such as fog lamps or like lamps).

Figure 3:
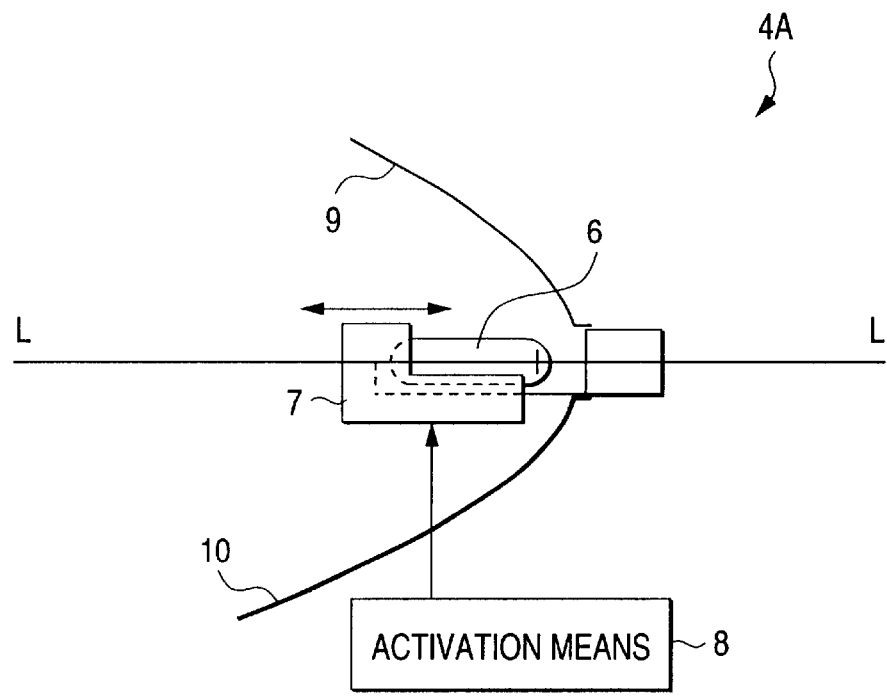
FIG. 3 is a schematic diagram illustrating a configuration of a vehicle lamp.

According to an example of the first method, a lamp 4A shown in FIG. 3 includes a light shielding member 7 located below a light source 6 (i.e., a metal halide lamp, an incandescent lamp, or a like) in such a way that the light shielding member 7 is moved along the primary light axis L—L of the lamp 4A by actuation means 8. A reflecting mirror includes a primary reflection mirror 9 located substantially above the horizontal plane, which includes the primary light axis L—L, and a sub-reflection mirror 10 located substantially below the horizontal plane.

Figure 4:
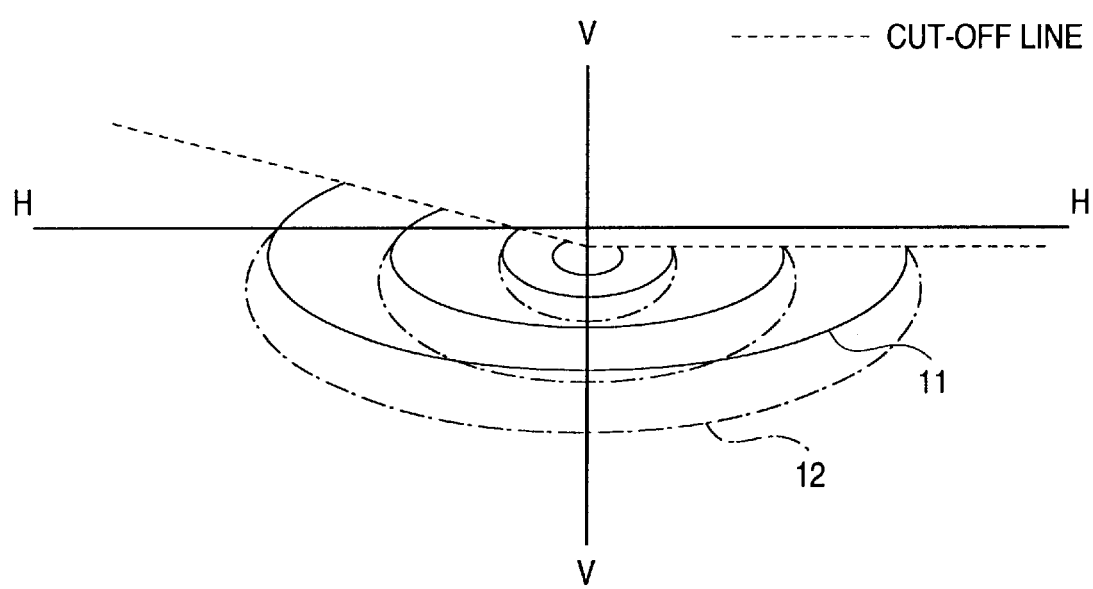
FIG. 4 is a schematic diagram illustrating a distribution of luminous intensity of the vehicle lamp shown in FIG. 3.

When the road surface is in a dry condition, a distribution pattern of luminous intensity 11 (hereinafter referred to as a "distribution pattern 11") as indicated by a solid line in FIG. 4 is formed by shielding the light, which travels to the sub-reflection mirror 10 from the light source 6, by means of the light shielding member 7. During the rainy weather, the light shielding member 7 is moved according to the wetness of the road surface to control the amount of the light. Thus, the light enters into the sub-reflection mirror 10 from the light source 6. As a result, a distribution pattern of luminous intensity 12 (hereinafter referred to as a "distribution pattern 12") is formed as indicated by a dashed line in FIG. 4. A geometry of the sub-reflection mirror 10 and a light axis of the sub-reflection mirror 10 are set such that the light reflected by the sub-reflection mirror 10 illuminates the road surface close to the front of the vehicle. Therefore, the amount of the light directed at the road surface close to the front of the vehicle is controlled by such a method.

Here, the primary reflection mirror 9 and the sub-reflection mirror 10 are not limited to a single reflection mirror surface. Alternatives such as a paraboloid of revolution, a composite reflection surface comprising a plurality of reflection regions, and a reflection surface formed by corrugation of a single curved surface may also be employed.

Figure 5:
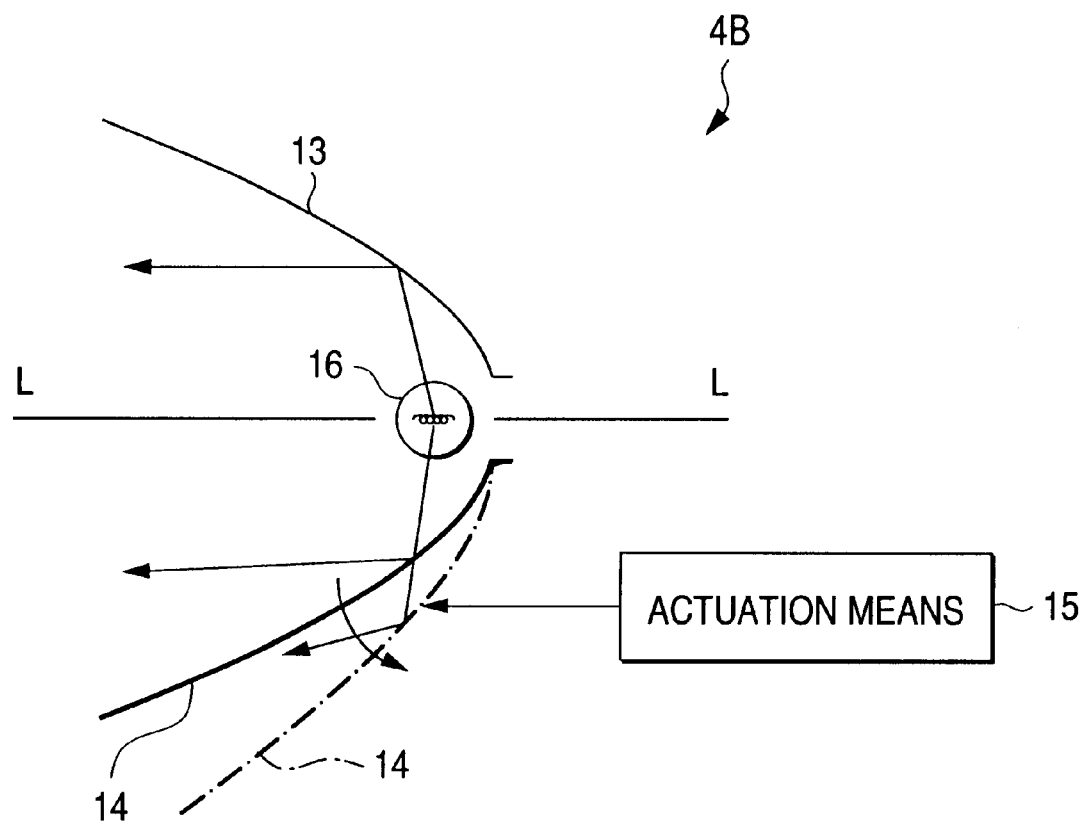
FIG. 5 is a schematic diagram illustrating another configuration of the vehicle lamp.

In a lamp 4B shown in FIG. 5, a primary reflection mirror 13 located substantially above the horizontal plane, which includes a primary light axis of the lamp 4B, is stationary. A sub-reflection mirror 14 located substantially below the horizontal plane is arranged so as to be pivoted within the vertical plane by actuation means 15. When the road surface is dry, the sub-reflection mirror 14 is held in a position indicated by a solid line in FIG. 5. A distribution pattern of luminous intensity obtained at this time is identical with the distribution pattern 11 indicated by a solid line in FIG. 4. During the rainy weather, the actuation means 15 makes the sub-reflection mirror 14 pivot downwardly according to the wetness of the road surface, as indicated by a dotted line shown in FIG. 5. As a result, the light directed to the sub-reflection mirror 14 from the light source 16 is radiated onto the road surface close to the front of the vehicle after being reflected by the sub-reflection mirror 14. Thus, a distribution pattern of luminous intensity becomes identical with the distribution pattern 12 indicated by a dotted line in FIG. 4.

The luminous intensity (or the intensity of light) of the lamp is increased according to the amount of rainfall (or snowfall). Alternatively, lamps capable of producing a beam of high luminous intensity, such as rear fog lamps, may be illuminated toward the following vehicles to increase the luminous intensity.

In connection with (II) fog, the following problems (II-1) through (II-3) must be solved:

(II-1) difficulty imposed in ascertaining a shoulder or lane marker ahead of the vehicle caused by a veiling phenomenon due to a diffraction or scattering of light by fog particles. Further, difficulty in driving the vehicle with main beams in dense fog.

(II-2) difficulty in ascertaining the light of the headlamps of oncoming vehicles, the degree of difficulty depending on the density of fog.

(II-3) difficulty in ascertaining the light of tail lights.

To solve the above problems, the following methods (II-i) through (II-iii) are employed:

(II-i) performance of headlamps is improved by a method, wherein the brightness of a veil is diminished by lowering the height of a cut line (or a cut-off line) of a dimmed beam of the headlamps, and the amount of illumination directed at the road surface close to the front of the vehicle is increased (by use of auxiliary lamps, by temporal change in the distribution of luminous intensity, or by a like method).

(II-ii) visibility of an oncoming vehicle is improved by a method, wherein the luminous intensity of lamps (such as headlamps, fog lamps, and small lamps) is incremented or decremented according to the density of fog, or a method of changing the color of light of lamps to a yellow color (during daytime fog, a distance of which the yellow color is recognized is longer than that of which the white light is recognized.

(II-iii) recognition of presence of the vehicle by the following vehicle is made easy by illumination of rear fog lamps in dense fog.

(III) In connection with snow, the following problems (III-1) through (III-3) must be solved:

(III-1) deterioration of recognition of the lane marker or the shoulder of the road because of a veiling phenomenon stemming from scattering of light by snow.

(III-2) difficulty in ascertaining the light of the headlamps of oncoming vehicles in conjunction with an increase in the amount of snowfall.

(III-3) difficulty in ascertaining the light of tail lights by snow flung by rear wheels of the vehicle in front.

In principle, a method similar to that previously described by reference to rain and snow is applicable as a solution to the problems posed by snow. However, the unique characteristics of snow condition must be taken into consideration. For instance, snow flung by the vehicle in front may be adhering to lamps, so that illumination and signaling capabilities of the lamps may be deteriorated. In such case, a heater or wipers may be provided for the lamps.

FIGS. 6 through 13 are an application of a system for controlling illumination of vehicle lamps according to the present invention.

In an illumination control system 17 shown in FIG. 6, a distribution-of-luminous-intensity controller 18 (hereinafter referred to as a "controller 18") is embodied by an electronic control unit including a computer. The controller 18 receives, as input signals and input data, a signal output from an automatic headlamp illumination switch 19, weather information from a road-to-vehicle communication/navigation device 20, a signal output from a wiper control switch 21, a detection signal output from an extraneous light detection sensor 22, information on a result obtained by an image captured by a CCD camera 23 and subsequently analyzed by an image analysis device 24, and a detection signal output from an outside air/humidity sensor 25. These signals and information are controlled in a unified way by way of a LAN (local area network), and are loaded into the controller 18.

Figure 6:
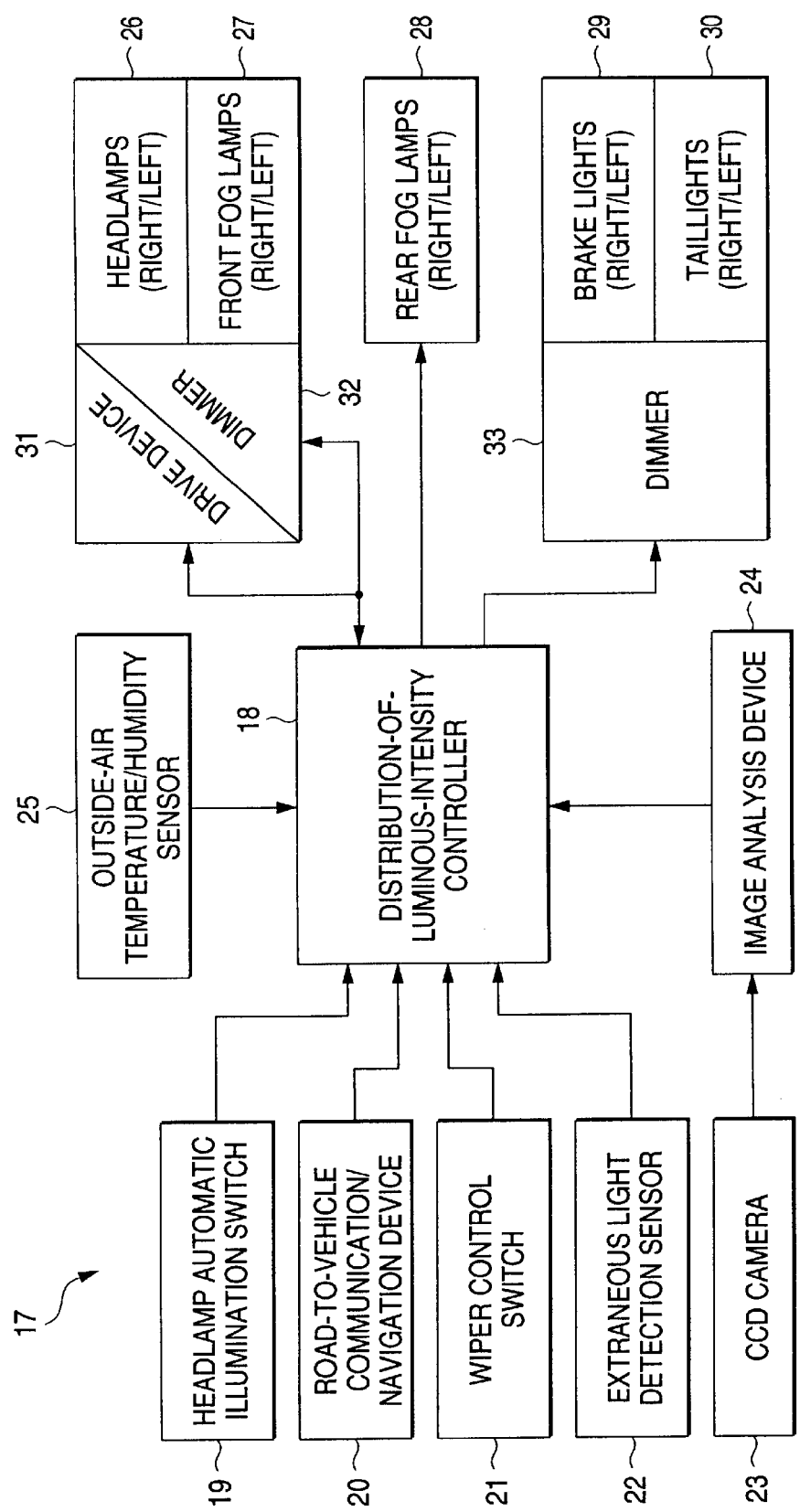
FIG. 6 is a block diagram illustrating a detailed illumination system according to a preferred embodiment of the present invention shown in FIG. 1.

Referring to FIGS. 1 and 6 at the same time, the CCD camera 23 corresponds to the image capturing means 2a. The image analysis device 24, which may be incorporated into the controller 18, is included in the weather analysis means 2b and the road surface analysis means 2c. The reference data acquisition means 2d includes the wiper control switch 21, the automatic illumination switch 19, the road-to-vehicle communication/navigation device 20, the extraneous light sensor 22, and the outside air/humidity sensor 25.

The controller 18 controls headlamps 26, front fog lamps 27, rear fog lamps 28, brake lights 29, and taillights 30. A drive device 31 for controlling the range and direction of illumination and a dimmer 32 for controlling the intensity of light are provided for the headlamps 26 and the front fog lamps 27. The drive device 31 and the dimmer 32 are also controlled by the controller 18. Further, another dimmer 33 is provided for the brake lights 29 and the taillights 30 and is under control by the controller 18. Lamps shown in FIG. 6 are only an example. The controller 18 also controls a high-mount brake light or heaters attached to the lights.

The foregoing illumination control system 17 initiates a control operation when an automatic mode is set through operation of the automatic illumination switch 19. In consideration of the reference data output from the wiper control switch 21 and data from the sensors, the illumination control system 17 controls the individual lamps according to a plurality of control modes relating to a driving environment (hereinafter referred to as "driving environment modes"), on the basis of a result of analysis of a captured image of the road surface ahead of the vehicle. For example, the following categories are provided as the driving environment modes:

(1) first control mode (fair weather at night)

(2) second control mode (rainfall/snowfall at night)

(3) third control mode (heavy rain/snow at night)

(4) fourth control mode (fair in the daytime)

(5) fifth control mode (heavy rain/snow in the daytime)

In the first control mode, the extraneous light is determined to be the nighttime on the basis of the image captured by the CCD camera 23 and the detection signal from the extraneous light detection sensor 22. Further, on the basis of the contrast of brightness or the weather information received from the road-to-vehicle communication/navigation device 20, the current weather is determined to be neither rainfall nor snowfall. In the first control mode, the lamps are automatically activated or deactivated. Specifically, if surroundings of the vehicle are found to be dark, small lamps are illuminated. When the surroundings are found to be completely dark, the headlamps 26 are illuminated, but the rear fog lamps 28 remain unilluminated.

(2) In the second control mode, the current weather is determined to be rainfall or snowfall at night, and one or more of the following control operations are performed:

(2-1) distribution of luminous intensity of dimmed beams of the headlamps 26 is set to a distribution of luminous intensity for use on a road covered with rain or snow, or the front fog lamps 27 are illuminated.

(2-2) In case that the headlamps 26 have the feature of changing the direction and range of illumination according to a steering angle or data regarding the geometric of the road output from a navigation system, the orientation of the light axis and the distribution of luminous intensity directed at oncoming traffic are changed so as to avoid dazzling drivers of oncoming vehicles in accordance with whether the weather is rainy of snowy.

(2-3) when the vehicle is stationary, the headlamps 26 are deactivated or dimmed, or the light aces of the headlamps 26 are lowered.

Figure 7:
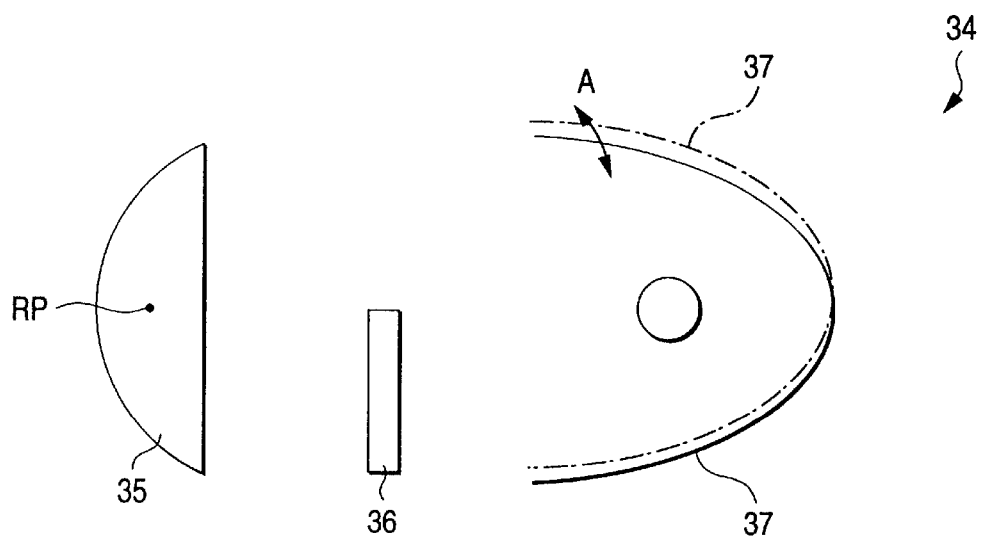
FIG. 7 is a schematic diagram illustrating a configuration of a projector lamp controlling a distribution of luminous intensity.
Figure 8:
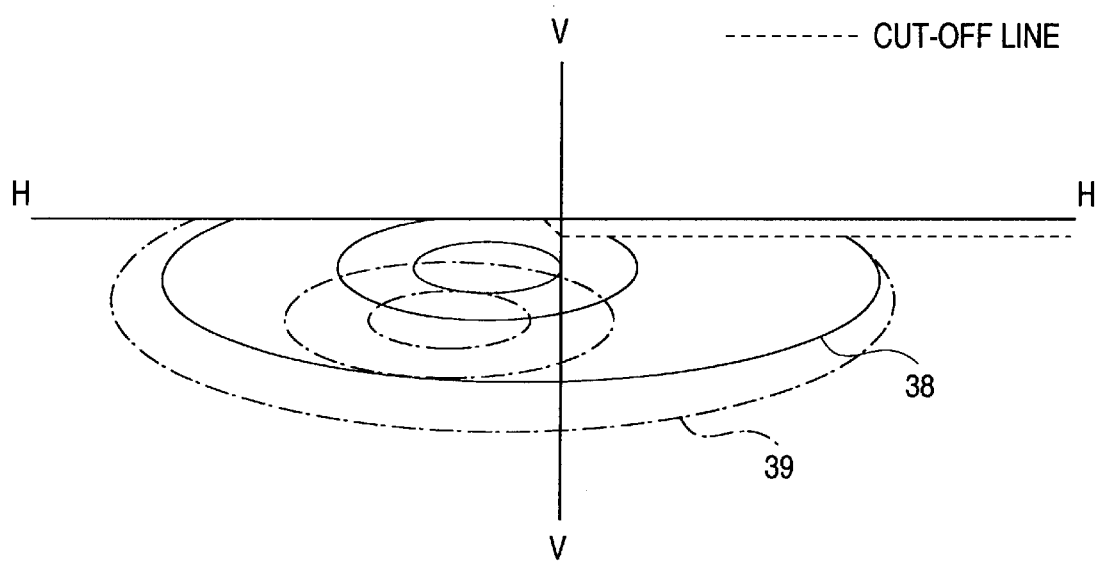
FIG. 8 is a schematic diagram illustrating a distribution of luminous intensity of the vehicle lamp shown in FIG. 7.

A distribution-of-luminous-intensity control type lamp has a configuration similar to that of a projector lamp 34 shown in FIG. 7. Specifically, the projector lamp 34 includes a lens 35 fixed on a lamp body (not shown), a shade 36, and a reflection mirror 37 which is pivoted around a rotation center RP within the vertical plane (the direction designated by the arrow A). During fair weather, the projector lamp 34 provides a distribution pattern of luminous intensity 38, as indicated by a solid line in FIG. 8. In contrast, during rainy weather, the projector lamp 34 provides a distribution pattern of luminous intensity 39, as indicated by a dashed line in FIG. 8. Although a cut-off line indicated by a broken line is maintained without changes, the maximum intensity portion of the pattern during rainy weather is lowered comparing to the pattern during fair weather, thereby illuminating the road close to the front of the vehicle more brightly.

Figure 9:
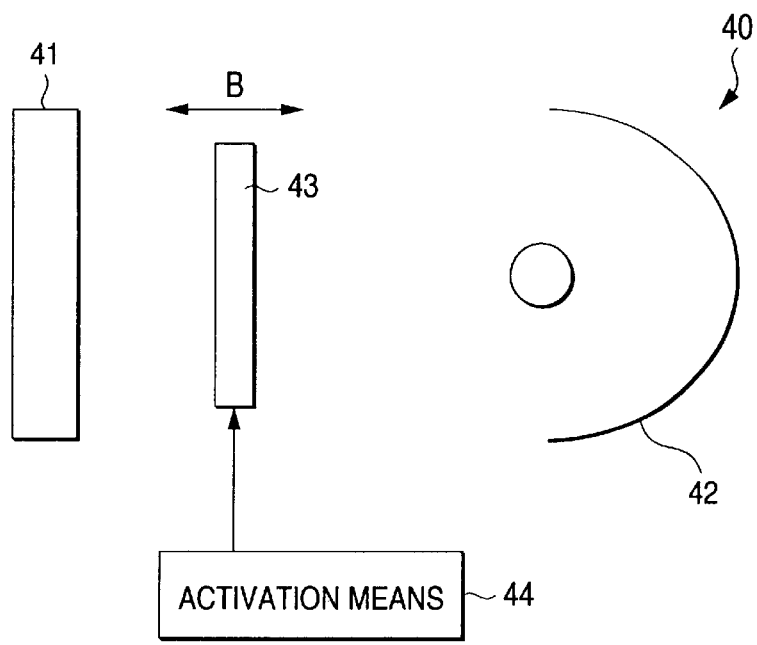
FIG. 9 is a schematic diagram illustrating a configuration of a distribution-of-luminous-intensity controllable lamp having an outer lens and an inner lens.
Figure 10:
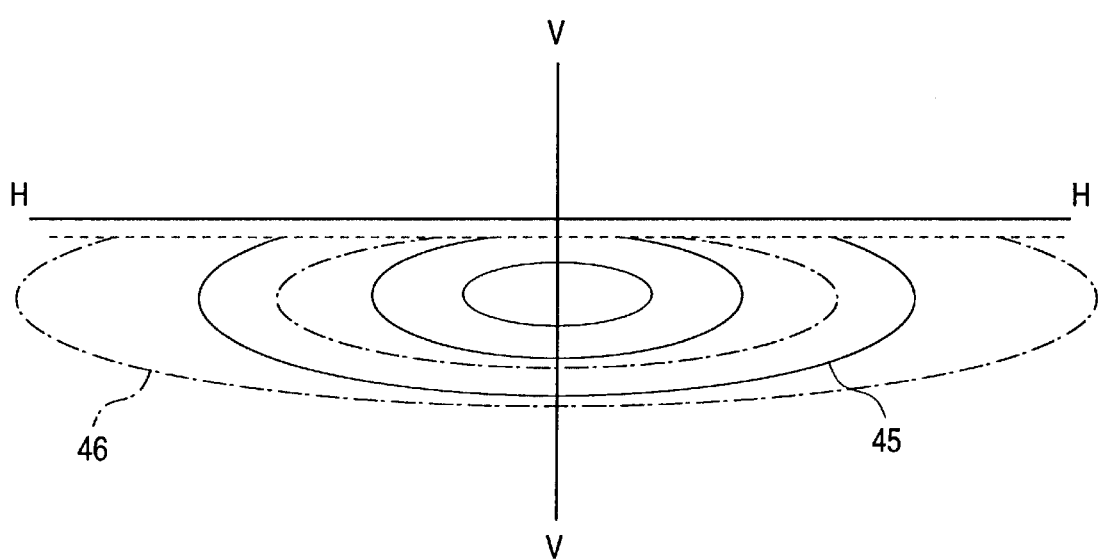
FIG. 10 is a schematic diagram illustrating a distribution of luminous intensity of the vehicle lamp shown in FIG. 9.

In a headlamp 40 shown in FIG. 9, an inner lens 43 is interposed between an outer lens 41 and a reflection mirror 42, an actuation means 44 (for example, and actuator or a like) is provided so as to actuate the inner lens 43 along the light axis of the lamp 40, as indicated by the arrow B. With this arrangement, an interval between the outer lens 41 and the inner lens 43 is changed, thereby controlling a degree of scattering of the illumination beam. In this case, as indicated by a solid line in FIG. 10, a distribution pattern of luminous intensity 45 for use in rainy weather (or foggy weather) is collective. In contrast, as indicated by a dashed line in FIG. 10, a distribution pattern of luminous intensity 46 for use in a fair weather is diffused horizontally. Thus, a distribution of luminous intensity can be controlled by controlling the location or orientational of optical members constituting the lamp or by changing the illumination light axis of the entire lamp.

The third control mode effects a control in rainfall or snowfall more eminently than the second control mode. The headlamps 26 are controlled in the same manner as the second control mode, and the front and rear fog lamps 27 and 28 are automatically illuminated. When the vehicle is not provided with the rear fog lamps 28, the luminous intensity and brightness of rear marker light is increases by means of dimming.

In the second and third control modes, when oncoming vehicles are detected by an image captured through the CCD camera 23, a distribution of luminous intensity is limited so as to avoid dazzling the drivers of the oncoming vehicles. However, when the presence of glare-reducing fences in the median strip are ascertained from the data received through the road-to-vehicle communication, consideration for dazzling drivers of oncoming vehicles is not necessary. Hence, the limitation to distribution of luminous intensity is canceled. In such a way, details of illumination control are changed according to the driving environment as desired.

Since the fourth control mode is for use in fair weather during the daytime, illumination of the headlamps 26 or the fog lamps is not required.

The fifth control mode is for use in the daytime. However, the headlamps 26, the front fog lamps 27, the rear fog lamps 28, and the taillights 30 are illuminated in consideration of effects on the light from heavy rain or snow. In case that the headlamps 26 also act as daytime running lights (lamps illuminated during the daytime), the luminous intensity of the lamps is desirably increased to assure recognition of presence of the vehicle by other vehicles. Further, the luminous intensity of the taillights 30 is increased to ensure recognition of presence of the vehicle by the following vehicles.

Figure 11:
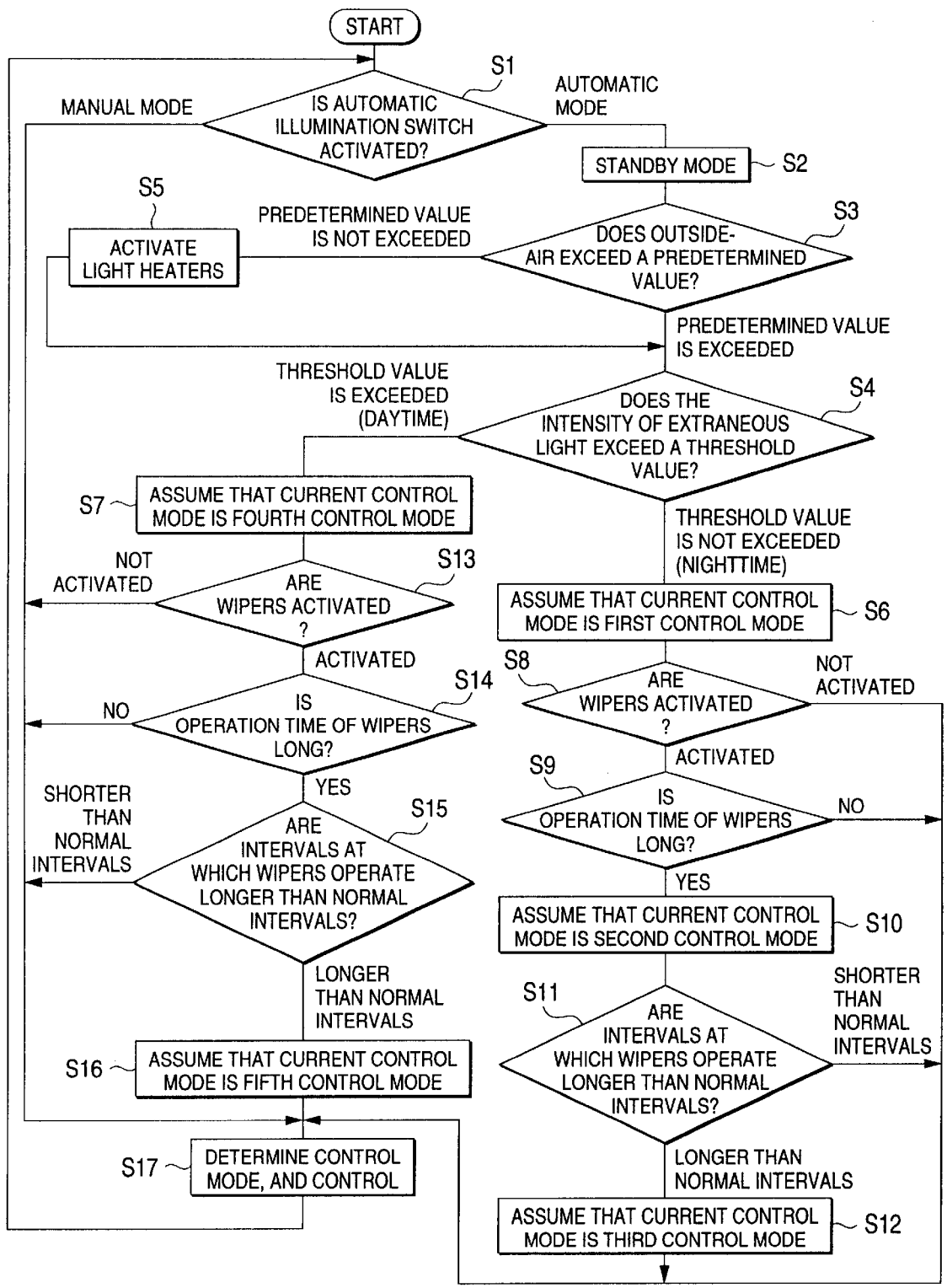
FIG. 11 is a flowchart illustrating an example of the steps for determining driving environment modes.

FIG. 11 is a flowchart for describing the steps for determination of the driving environment modes in consideration of primarily the intensity of extraneous light and the operation of wipers. In step S1, a determination is made as to whether or not the automatic illumination switch 19 is in an automatic mode. If the automatic mode is in effect, the process step moves to step S2. If not, the automatic illumination switch 19 is determined to be in a manual mode (a mode in which the headlamps are illuminated through manual switching action), and the process step moves to step S17.

The illumination control system 17 changes to a standby mode in step S2 and determines in step S3 whether or not the outside air temperature exceeds a predetermined value. If the outside air temperature exceeds a predetermined value, step S4 is processed. In contrast, if the outside air temperature is not equal to or not greater than the predetermined value, the process step advances to step S5, where lamp deicing heaters (e.g., heaters attached to lenses) are activated. Subsequently, the process advances to step S4.

In step 4, from the detection signal output from extraneous light detection sensor 22, a determination is made as to whether it is a daytime or nighttime based on whether or not the intensity of extraneous light exceeds a threshold value. If it is determined to be a nighttime, the process step goes to step S6. In contrast, if it is determined to be a daytime, the process step advances to step S7.

In step S6, after the driving environment mode has been assumed corresponding to the first control mode, a determination is made as to whether the wipers are activated or not. If the wipers are determined to be activated, the process advances to step S9. If the wipers are determined not to be activated, the process advances to step S17.

In step S9, a period of time during which the wipers are operating is compared with a predetermined value, thereby determining whether the period is long or short. If the operation time is long, the process step advances to step S10. Conversely, if the operation time is short, the process advances to step S17.

In step S10, after the driving environment mode has been determined as the second control mode, the process step advances to step S11, where a determination is made as to whether intervals at which the wipers are activated are longer or shorter than the preset intervals from the selected position of the control switch 21 or the extent to which the control switch 21 is moved. If the intervals are short, the process step advances to step S12. Conversely, if the intervals are long, the process step advances to step S17.

In step S12, after the driving environment mode has been determined as the third control mode, the process step advances to step S17. If it is determined to be a daytime in step S4, the process step advances to step S13 after the driving environment mode has been determined as the fourth control mode. A determination is then made as to whether the wipers are activated or not. If the wipers are activated, the process step advances to step S14. On the contrary, if the wipers are not activated, the process step advances to step S17.

In step S14, the time period during which the wipers are operating is compared with a predetermined value, thereby determining whether the operation time is long or short. If the operation time is long, the process step advances to step S15. If the operation time is short, the process step advances to step S17.

In step S15, from the selected position of the control switch 21 or the extent to which the control switch 21 is moved, a determination is made as to whether the intervals at which the wipers are activated are longer or shorter than the predetermined intervals. If the intervals are shorter than the predetermined intervals, the process step advances to step S16. Conversely, if the intervals are longer than the predetermined intervals, the process step advances to step S17.

In step S16, after the driving environment mode has been determined as the fifth control mode, the process step advances to step S17.

In step S17, the control modes determined in steps S6, S7, S10, S12, and S16 are verified through comprehensive analysis performed on the basis of the data received from the image analysis device 24 and the road-to-vehicle communication/navigation device 20. Further, illumination of the individual lamps is controlled according to the determined control mode. Subsequently, the process step returns to step S1. A determination of the control mode is not required to be carried out in once. Thus, the control mode may be determined after repetitions of the determination to eliminate faulty settings or operations.

Figure 12:
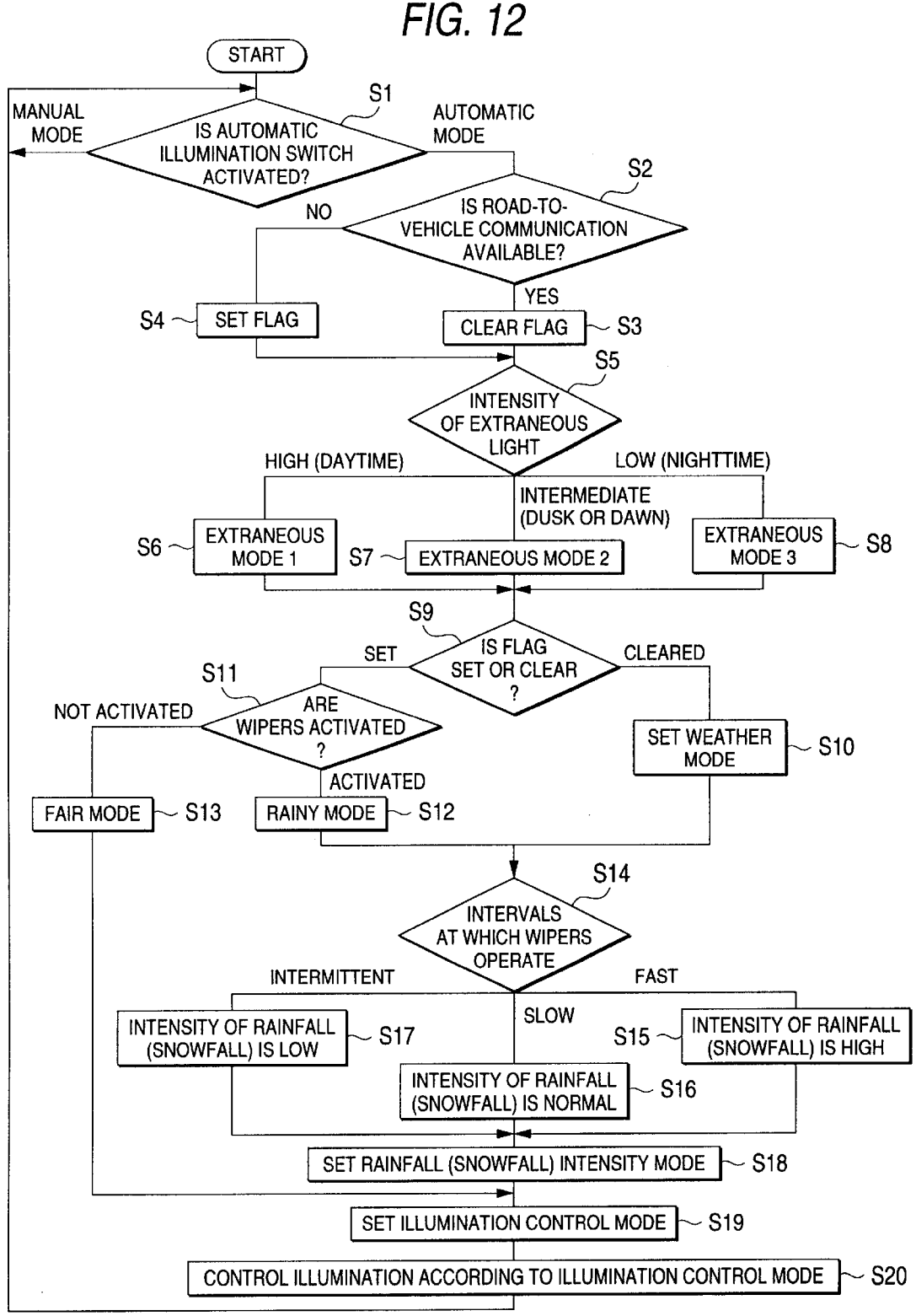
FIG. 12 is a flowchart illustrating another example of the steps for determining driving environment modes.

An example of control provided in a flowchart shown in FIG. 12 may be applied to the case where a determination is made as to whether it is daytime, nighttime, dusk, or dawn by utilization of the weather information received over road-to-vehicle communication or through a use of an extraneous light detection signal.

The present example employs weather modes (fair, raining, snowing, and foggy), extraneous light modes 1 (i=1: daytime, i=2: dusk or dawn, and i=3: nighttime), and rainfall (or snowfall) mode (mode categories corresponding to the amount of rainfall or snowfall). Lamp illumination control modes correspond to the respective mode combinations. For example, if the weather mode is a "fair weather," and the extraneous light mode is "1 (daytime), " the illumination control mode in effect at this time corresponds to the fourth control mode.

In step S1, a determination is made as to whether or not the automatic illumination switch 19 is set to an automatic mode. If the automatic mode is in effect, the process step advances to step S2. If the automatic mode is not in effect, the automatic illumination switch 19 is determined to be held in a manual mode.

In step S2, a determination is made as to whether or not a road-to-vehicle communication facility is available or as to whether or not road-to-vehicle communication is used in this step. Here, in the road-to-vehicle communication, the data including weather information transmitted to a receiver of the vehicle from a transmission facility are disposed along the shoulder of the road or in the median strip. If a road-to-vehicle communications facility is available, the process step advances to step S3, where a setting flag is cleared. Then, step S5 is proceeded. In contrast, if no road-to-vehicle communications facility is available, the process step advances to step S4, where a setting flag is set. Step S5 is then proceeded. The determination as to whether or not the road-to-vehicle vehicle communications facility is available is to determine whether or not a reference must be made to the operating condition of the wipers as well as to reflect such determination in the control of illumination. For example, since glare-reducing fences are provided in the median strip of the road equipped with a road-to-vehicle communications facility, a consideration to avoid dazzling by the oncoming traffic is not required. Consequently, unnecessary control of illumination can be eliminated by preventing indiscriminate limitations to the distribution of luminous intensity, which in this case is intended to avoid dazzling by the oncoming traffic.

In step S5, on the basis of the detection signal output from the extraneous light selection sensor 22, the intensity of extraneous light is determined. More specifically, if the intensity of extraneous light is high, the process step advances to step S6, where the extraneous light mode is determined to be 1 (daytime). If the intensity of extraneous light is low, the process step advances to step S8, where the extraneous light mode is determined to be 3 (nighttime). If the intensity of extraneous light mode is intermediate, the process step advances to step S7, where the extraneous light mode is determined to be 2 (dusk or dawn).

In step S9, a determination is made with regard to the flags set in steps S3 and S4. If the flags are cleared, the process step advances to step S10. In contrast, if the flags are set, the process step advances to step S11.

In step S10, the weather information is received via the road-to-vehicle communication, and a determination is made with regard to a weather mode on the basis of the weather information of the data received from the image analysis device 24. Subsequently, the process step advances to step S14.

In step S11, a determination is made as to whether the wipers are activated or not. When the wipers are activated, the process step advances to step S12, where the weather mode is determined to be "rainy weather." Then, the process step advance to step S14. In contrast, when the wipers are not activated, the process step advances to step S13, where the weather mode is set to "fair weather." The processing then advances to step S19.

In step S14, the amount of rainfall (or snowfall) is determined from the intervals at which the wipers are activated and the operation of the wipers (i.e., continuous operation or intermittent operation). More specifically, when the intervals are short, the process step advances to step S15, where the amount of rainfall (or snowfall) is determined to be high. The process step then advances to step S18. In contrast, when the intervals are long, the process step advances to step S16, where the amount of rainfall (or snowfall) is determined to be ordinary. The process step then advances to step S18. For an intermittent operation of the wipers, the process step advances to step S17, and a determination is made that the amount of rainfall (or snowfall) is low or rain (or snow) that has recently started to fall. Subsequently, the process step advances to step S18.

In step S18, based on a comprehensive analysis of the results of determinations made in steps S15 through S17, the data received from the image analysis device 24, and the information regarding the amount of rainfall (or snowfall) received over road-to-vehicle communication (in a case where the information is available), the rainfall (or snowfall) intensity mode is determined. Subsequently, the process step advances to step S19.

In step S19, a lamp illumination control mode corresponding to the combination of a weather mode, an extraneous light mode, and the rainfall (or snowfall) intensity mode is determined. Then, the process step advances to step S20, where illumination of lamps is controlled in a predetermined manner for each control mode (details of control are omitted, in order to prevent repetition of descriptions). Subsequently, the process step returns to step S15.

During a foggy weather, the control of headlamps is desirably changed in consideration of the density of fog and presence/absence of oncoming vehicles and a vehicle in front.

Figure 13:
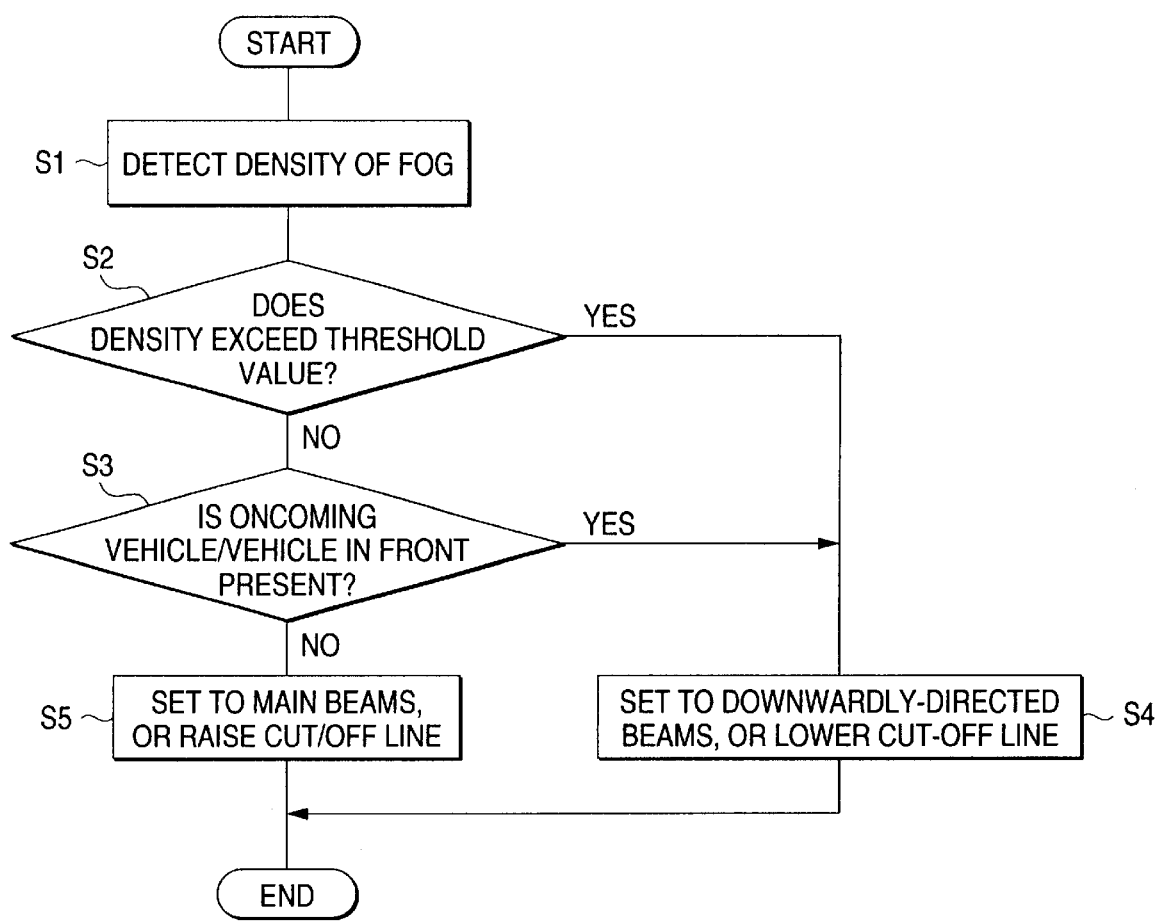
FIG. 13 is a flowchart illustrating an example of the steps for controlling headlamps in a foggy condition.

For instance, as shown in a flowchart of FIG. 13, a density of fog is detected in step S1. The density of fog is determined by measuring a transmissivity of laser light in the fog, or by using the information received via road-to-vehicle communication or the data obtained through analysis of an image.

In step S2, the determined density of the fog is compared with a threshold value (%). If the detected density is equal to or greater than the threshold value, the process step advances to step S4. If the density is not equal to or greater than the threshold value, the process step advances to step S3.

In step S3, a determination is made to as to whether or oncoming vehicles and a vehicle in front are present. If these vehicles are present, the process step advances to step S4. In contrast, if these vehicles are not present, the process step advances to step S5. Presence of oncoming vehicles and a vehicle in front is determined from the result of the analysis of a captured image, by detection of beams from oncoming vehicles and a vehicle in front by an optical sensor, or by detection of ultrasonic waves reflected from an exhaust pipe of the vehicle in front or from oncoming vehicles.

In step S4, the beam emanated from the headlamps 26 are set to be downwardly-directed beams (so-called low beams), and the front fog lamps 27 are illuminated in conjunction with the low beams, as desired.

In step S5, the beams emanated from the headlamps 26 are set to be main beams (so-called high beams), and the front fog lamps 27 are illuminated in conjunction with the main beams, as desired.

If the headlamps 26 have a mechanism for changing the height of a cut-offline of the downwardly-directed beams (e.g., a mechanism for controlling the height of a shade or a level ring mechanism for tilting the light axis within a vertical plane), the height of the cut-off line is lowered in step S4 (e.g., the light axis is tilted downwardly). Alternatively, a step S5 the height of the cut-off line may be controlled to be raised (e.g., the light axis is brought to a level state or an upper position).

In the foregoing illumination control system 17, a control of headlamps, a distribution of luminous intensity of marker lights, and an intensity of light are appropriately controlled under various weather conditions including rain, fog, and snow. Therefore, the present invention contributes to prevent traffic accidents and provide a safe driving.

In the previous description, a determination relating to weather conditions and road surface conditions or a determination as to various mode categories is illustrative. For example, determination logic is not limited to a Boolean logic but may also be a fuzzy logic. Accordingly, it will be apparent to those skilled in the art that various modification and variations can be made in the capacitor and the manufacturing method thereof of the present invention without departing from the spirit or scope of the inventions. Thus, it is intended that the present invention cover the modifications and variations of this invention provided they come within the scope of the appended claims and their equivalents.

What is claimed is:

1. A vehicle lamp system comprising:
   vehicle lamps;
   image capturing means for acquiring image data of vehicle surroundings;
   weather analysis means for determining weather conditions outside a vehicle from the image data received from the image capturing means;
   road surface analysis means for determining road surface conditions from the image data received from the image capturing means;
   reference data acquisition means for acquiring reference data to determine the weather or road surface conditions from reference data other than the image data of the vehicle surroundings, wherein the reference data acquisition means includes a control switch for activating vehicle wipers, an extraneous light detecting device for detecting ambient light, and a receiver for signals from a communication device provided on a road for receiving the weather and road surface conditions; and
   illumination control means for controlling an illumination of the vehicle lamps based on the weather and road surface conditions received from the weather analysis means and the road surface analysis means.

2. The vehicle lamp system according to claim 1, further comprising driving means for changing a range and direction of the illumination of the vehicle lamps.

3. The vehicle lamp system according to claim 1, wherein the illumination includes a distribution of a luminous intensity, a light intensity, and a light color.

4. The vehicle lamp system according to claim 1, wherein the road surface analysis means determines the road surface conditions by a brightness contrast of a lane marker on a road.

5. The vehicle lamp system according to claim 4, wherein the brightness contrast of the lane marker is analyzed through a correlation between a brightness and a voltage output from the image capturing means.

6. The vehicle lamp system according to claim 1, wherein the vehicle lamps include:
   a light source;
   a light shielding member located below the light source;
   a reflection mirror reflecting light from the light source and located substantially above a primary light axis;
   actuation means for actuating the light shielding member along the primary light axis; and
   a sub-reflection mirror reflecting light from the light source and located substantially below the primary light axis.

7. The vehicle lamp system according to claim 1, wherein the vehicle lamps include:
   a light source;
   a reflection mirror reflecting light from the light source and located substantially above a primary light axis;
   a sub-reflection mirror reflecting light from the light source and located substantially below the primary light axis; and
   actuation means for actuating the sub-reflection mirror in a pivotal motion.

8. The vehicle lamp system according to claim 1, wherein the vehicle lamps include:
   a light source;
   a lens focusing an illumination of the light source;
   a reflection mirror reflecting the illumination of the light source and pivoting around a rotation center; and
   a shade adjusting the illumination of the light source.

9. The vehicle lamp system comprising:
   a light source;
   a reflection mirror reflecting the light source;
   an inner lens located in front of the light source and focusing an illumination of the light source;
   an outer lens focusing the illumination of the light source after the illumination is passed through the inner lens;
   actuation means for adjusting a distance between the inner lens and the outer lens;
   environment detection means for detecting weather and road surface conditions;
   illumination control means for controlling an illumination of the light source based on the weather and road surface conditions received from the environment detection means.

10. The vehicle lamp system according to claim 1, wherein the image capturing means includes a charge coupled device.

11. A vehicle lamp system comprising:
    vehicle lamps;
    a lamp driving device for controlling a range and a direction of an illumination of the lamps;
    a lamp dimmer for controlling an intensity of the lamps;
    image capturing means for acquiring image data of vehicle surroundings;
    weather analysis means for determining weather conditions outside the vehicle from the image data received from the image capturing means;
    road surface analysis means for determining road surface conditions from the image data received from the image capturing means;
    reference data acquisition means for acquiring reference data to determine the weather or road surface conditions from reference data other than the image data of vehicle surroundings, wherein the reference data acquisition means includes a control switch for activating vehicle wipers, an extraneous light detecting device for detecting ambient light, and a receiver for signals from a communication device provided on a road for receiving the weather and road surface conditions; and
    illumination control means for controlling the lamp driving device and the lamp dimmer based on the weather and road surface conditions received from the weather analysis means and the road surface analysis means.

12. The vehicle lamp system according to claim 11, wherein the illumination includes a distribution of a luminous intensity, a light intensity, and a light color.

13. The vehicle lamp system according to claim 11, wherein the road surface analysis means determines the road surface conditions by a brightness contrast of a lane marker on a road.

14. The vehicle lamp system according to claim 13, wherein the brightness contrast of the lane marker is analyzed through a correlation between a brightness and a voltage output from the image capturing means.

15. The vehicle lamp system according to claim 11, wherein the vehicle lamps include:
a light source;
a light shielding member located below the light source;
a reflection mirror reflecting light from the light source and located substantially above a primary light axis;
actuation means for actuating the light shielding member along the primary light axis; and
a sub-reflection mirror reflecting light from the light source and located substantially below the primary light axis.

16. The vehicle lamp system according to claim 11, wherein the vehicle lamps include:
a light source;
a reflection mirror reflecting light from the light source and located substantially above a primary light axis;
a sub-reflection mirror reflecting light from the light source and located substantially below the primary light axis; and
actuation means for actuating the sub-reflection mirror in a pivotal motion.

17. The vehicle lamp system according to claim 11, wherein the vehicle lamps include:
a light source;
a lens focusing an illumination of the light source;
a reflection mirror reflecting the illumination of the light source and pivoting around a rotation center; and
a shade adjusting the illumination of the light source.

18. A vehicle lamp system comprising:
a light source;
a reflection mirror reflecting the light source;
an inner lens locating in front of the light source and focusing an illumination of the light source;
an outer lens focusing the illumination of the light source after the illumination is passed through the inner lens;
actuation means for adjusting a distance between the inner lens and the outer lens;
a lamp driving device for controlling a range and a direction of an illumination of the lamps;
a lamp dimmer for controlling an intensity of the lamps;
environment detection means for detecting weather and road surface conditions;
illumination control means for controlling the lamp driving device and the lamp dimmer based on the weather and road surface conditions received from the environment detection means.

19. The vehicle lamp system according to claim 11, wherein the image capturing means includes a charge coupled device.

20. A vehicle lamp system comprising:
vehicle lamps;
image capturing means for acquiring image data of vehicle surroundings;
road surface analysis means for determining road surface conditions from the image data received from the image capturing means;
reference data acquisitions means for acquiring reference data to determine the road surface conditions from reference data or other than the image data of the vehicle surroundings, wherein the reference data acquisition means includes a control switch for activating vehicle wipers, an extraneous light detecting device for detecting ambient light, and a receiver for signals from a communication device provided on a road for receiving the road surface conditions; and
illumination control means for controlling an illumination of the vehicle lamps based on the road surface conditions received from the road surface analysis means.

21. The vehicle lamp system according to claim 20, further comprising driving means for charging a range and direction of the illumination of the vehicle lamps.

22. The vehicle lamp system according to claim 20, wherein the illumination includes a distribution of a luminous intensity, a light intensity, and a light color.

23. The vehicle lamp system according to claim 20, wherein the road surface analysis means determines the road surface conditions by a brightness contrast of a lane marker on a road.

24. The vehicle lamp system according to claim 23, wherein the brightness contrast of the lane marker is analyzed through a correlation between a brightness and a voltage output from the image capturing means.

25. The vehicle lamp system according to claim 20, wherein the vehicle lamps include:
a light source;
a light shielding member located below the light source;
a reflection mirror reflecting light from the light source and located substantially above a primary light axis;
actuation means for actuating the light shielding member along the primary light axis; and
a sub-reflection mirror reflecting light from the light source and located substantially below the primary light axis.

26. The vehicle lamp system according to claim 21, wherein the vehicle lamps include:
a light source;
a reflection mirror reflecting light from the light source and located substantially above a primary light axis;
a sub-reflection mirror reflecting light from the light source and located substantially below the primary light axis; and
actuation means for actuating the sub-reflection mirror in a pivotal motion.

27. The vehicle lamp system according to claim 20, wherein the vehicle lamps include:
a light source;
a lens focusing an illuminating of the light source;
a reflection mirror reflecting the illumination of the light source and pivoting around a rotation center; and
a shade adjusting the illumination of the light source.

28. The vehicle lamp system according to claim 20, wherein the vehicle lamps include:
a light source;
a reflection mirror reflecting the light source;
an inner lens locating in front of the light source and focusing an illumination of the light source;
an outer lens focusing the illumination of the light source after the illumination is passed through the inner lens; and
actuation means for adjusting a distance between the inner lens and the outer lens.

29. The vehicle lamp system according to claim 20, wherein the image capturing means includes a charge coupled device.

30. A vehicle lamp system comprising:

vehicle lamps;

a lamp driving device for controlling a range and a direction of an illumination of the lamps;

a lamp dimmer for controlling an intensity of the lamps;

image capturing means for acquiring image data of vehicle surroundings;

road surface analysis means for determining road surface conditions from the image data received from the image capturing means;

reference data acquisition means for acquiring reference data to determine the road surface conditions from reference data other than the image data of vehicle surroundings, wherein the reference data acquisition means includes a control switch for activating vehicle wipers, an extraneous light detecting device for detecting ambient light, and a receiver for signals from a communication device provided on a road for receiving the road surface conditions; and illumination control means for controlling the lamp driving device and the lamp dimmer based on the weather and road surface conditions received from the road surface analysis means.

* * * * *